UNITED STATES PATENT OFFICE.

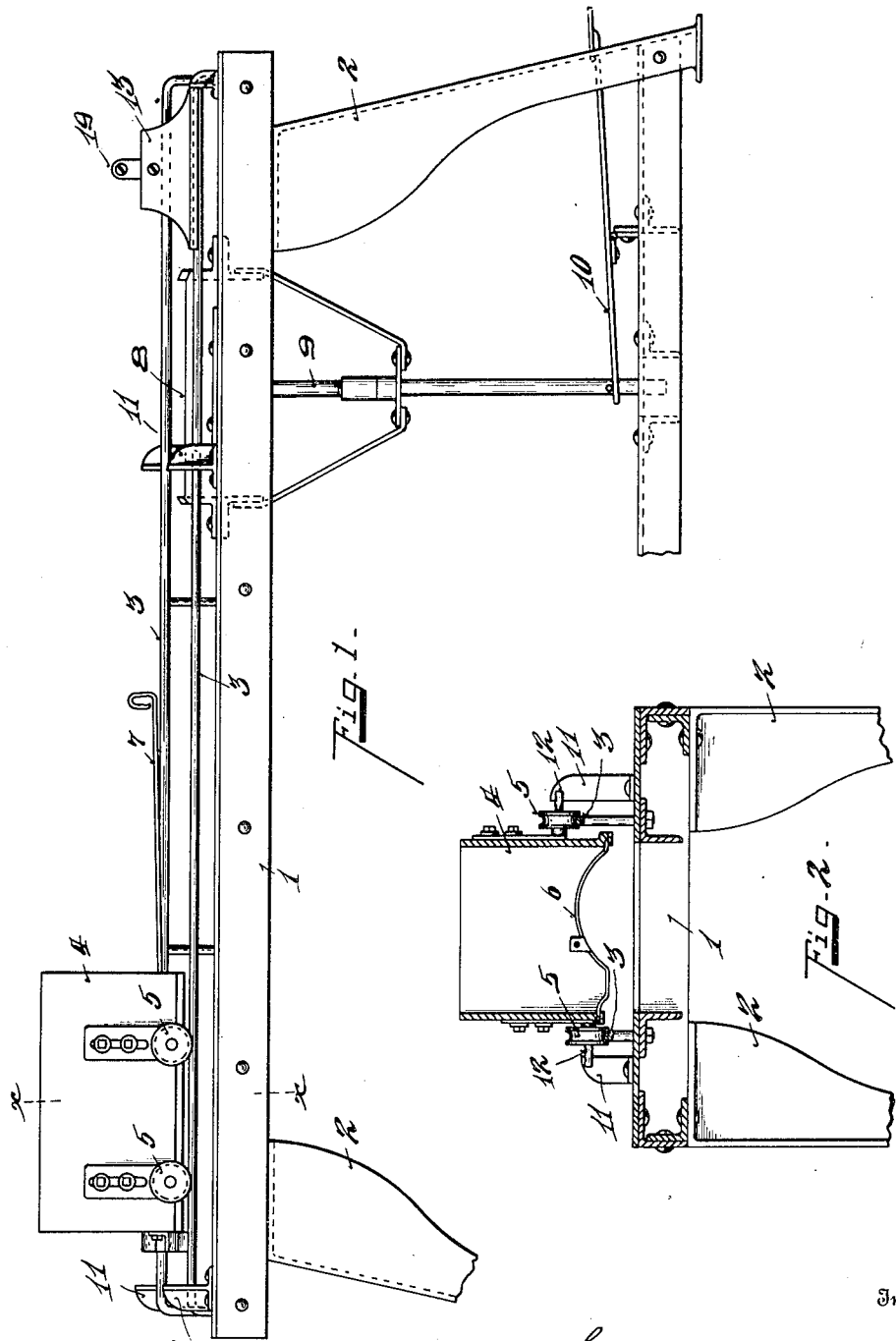

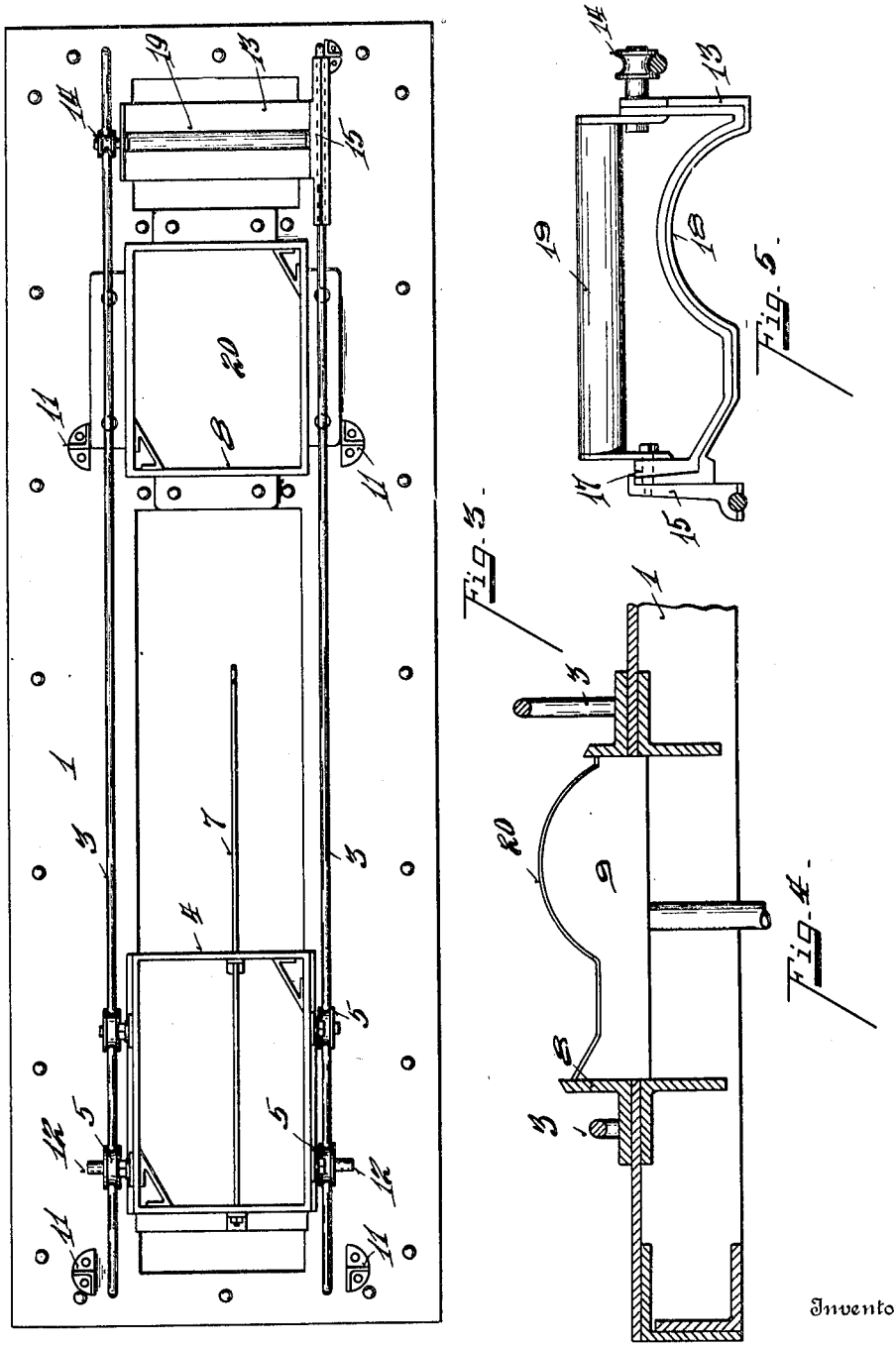

THOMAS P. HACKETT, OF CINCINNATI, OHIO, ASSIGNOR TO ARCHITECTURAL STONE COMPANY, OF CINCINNATI, OHIO, A CORPORATION.

MACHINE FOR MAKING CEMENT TILES.

943,971.   Specification of Letters Patent.   Patented Dec. 21, 1909.

Application filed June 7, 1909. Serial No. 500,706.

*To all whom it may concern:*

Be it known that I, THOMAS P. HACKETT, a citizen of the United States, residing at Cincinnati, in the county of Hamilton and State of Ohio, have invented certain new and useful Improvements in Machines for Making Cement Tiles, of which the following is a specification.

My invention relates to an improved machine for manufacturing cement tiles of a type used for roofing.

The object of the invention is to produce a simple and conveniently manipulated mechanism for making these cement products with the least manual operations possible.

The features of the invention are more fully set forth in the description of the accompanying drawings, forming a part of this specification, in which:—

Figure 1 is a side elevation of my improved machine. Fig. 2 is a section through the hopper on line $x$, $x$, Fig. 1. Fig. 3 is a top plan view of the machine. Fig. 4 is an enlarged detail longitudinal section through the mold. Fig. 5 is an end elevation of the trowel.

1 represents the bed of the machine mounted on suitable supports 2, and provided with the side rails 3, upon which the hopper 4 travels, the hopper wheels 5 engaging the rails. The bottom of the hopper is provided with a sliding door 6, conforming in outline to the surface of the article to be formed, the said door being opened and closed by manipulating the rod 7. The mold 8 is formed at one end of the bed.

9 is a plunger vertically reciprocating within the mold under the control of the foot treadle 10. The side rails are provided with stops 11, adjacent the front end of the molds, which coöperate with the stud pin 12, projected from the hopper wheels 5, so as to properly register the hopper door with the opening of the molds when the hopper is moved into position for depositing the cement into the mold and limit the forward and rearward travel of the hopper.

13 represents a trowel, having a roller 14, engaging over the rails 3, and a bracket 15 engaging the other rail. This trowel is pivotally connected with the pivot bolt 17 attached to the bracket 15 at one end, and the roller 14 serving as a pivot at the opposite end. The working face of the trowel is formed of a plate 18, forming an outline to the shape of the upper surface of the article to be produced. The trowel is also provided with a handle 19, by means of which the trowel 13 may be reciprocated on the bed rails, or, oscillated with a rocking motion on its pivotal supports.

20 represents a pallet conforming in outline to the shape of the undersurface of the article to be produced. It is detachably placed in the mold 8 upon the plunger 9. The hopper door 6 and the pallet 20 form the dies between which the cement is shaped, and the trowel 13 is a finishing instrumentality likewise conforming to the shape of the upper surface of the cement article.

In operation, the hopper 4 is in position at the front end of the machine, shown in Fig. 1, with the sliding door 6 closed, and the plastic cement is introduced into the hopper. The hopper is then rolled to the other end of the machine, and the forming door 6 is registered with the mold 8. The plunger being lowered to its proper depth in the mold, the door 6 is opened, and the cement deposited upon the pallet 20 supported by the plunger 9 within the mold. When the mold is filled and the door 6 is closed, the plunger 9 may be raised and the plastic cement is pressed into shape between the dies 6 and 20, and in this position the upper surface of the article under construction is substantially flush with the working surface of the trowel. After the pressing operation, the hopper is returned to the front end of the machine and the trowel is moved into position over the work and reciprocated or oscillated or both, to administer the final troweling or finishing touches to the work. When completed the trowel is returned to the rear of the machine, as shown in Fig. 1, and the article may be removed by removing the pallet 20 from the mold and given its final set upon this pallet. These are all machine operations affording the greatest convenience and efficiency in the formation of the tile and require no manual handling of the article itself until after it is completely finished.

Having described my invention, I claim:—

In a machine for forming cement tiles, a bed formed with a hopper-way and mold, a plunger adapted to reciprocate in said mold, a hopper movably mounted on said way and formed with a door having the conformation of the article to be formed, a pallet shaped to conform to the under surface of the tile removably supported on the plunger, a trowel movably mounted on said way and formed with the working surface corresponding in shape to the door, means for locking said trowel on said hopper-way, and a hopper stop located in said way and adapted to register the hopper door with the mold.

In testimony whereof, I have hereunto set my hand.

THOMAS P. HACKETT.

Witnesses:
OLIVER B. KAISER,
EMMA SPENCER.